United States Patent
Huang

(10) Patent No.: US 6,302,569 B1
(45) Date of Patent: Oct. 16, 2001

(54) SPRING CLIP FOR A VEHICLE LIGHT HOLDER RING

(75) Inventor: Nan Huang Huang, Rancho Palos Verdes, CA (US)

(73) Assignee: Grand General Accessories Manufacturing Inc., Compton, CA (US)

( * ) Notice: Subject to any disclaimer, the term of this patent is extended or adjusted under 35 U.S.C. 154(b) by 0 days.

(21) Appl. No.: 09/598,396

(22) Filed: Jun. 20, 2000

(51) Int. Cl.[7] ............................................. B60Q 3/00
(52) U.S. Cl. ................................. 362/546; 362/368
(58) Field of Search ................................ 362/546, 353, 362/363, 368, 369

(56) References Cited

U.S. PATENT DOCUMENTS

| | | | |
|---|---|---|---|
| 5,089,939 | * | 2/1992 | Baader ................................. 362/61 |
| 5,709,450 | * | 1/1998 | Francis et al. ........................ 362/61 |
| 5,909,955 | * | 6/1999 | Roorda ................................ 362/368 |
| 5,941,625 | * | 8/1999 | Morand .............................. 362/148 |
| 6,062,709 | * | 5/2000 | Cunnien et al. ..................... 362/267 |

* cited by examiner

Primary Examiner—Sandra O'Shea
Assistant Examiner—Jacob Choi
(74) Attorney, Agent, or Firm—Thomas I. Rozsa; Tony D. Chen; Jerry Fong

(57) ABSTRACT

A vehicle light holder ring for vehicle light fixtures and mounted within an aperture provided on a body of a vehicle, including a central opening and at least three mounting apertures. A rim is attached to the light holder ring and surrounds the central opening. A flange is attached to the rim to form an interior diameter for retaining one diameter of the light fixture. A plurality of springs are attached to a rear edge of the flange and extend inwardly in a radial direction to form a diameter which is slightly smaller than the diameter of the flange for tightly retaining a plurality of different diameters of the light fixture. The light holder ring further includes at least three retaining clips attached to a bottom edge of the rim for holding a bottom end of the light fixture to the light holder ring.

8 Claims, 2 Drawing Sheets

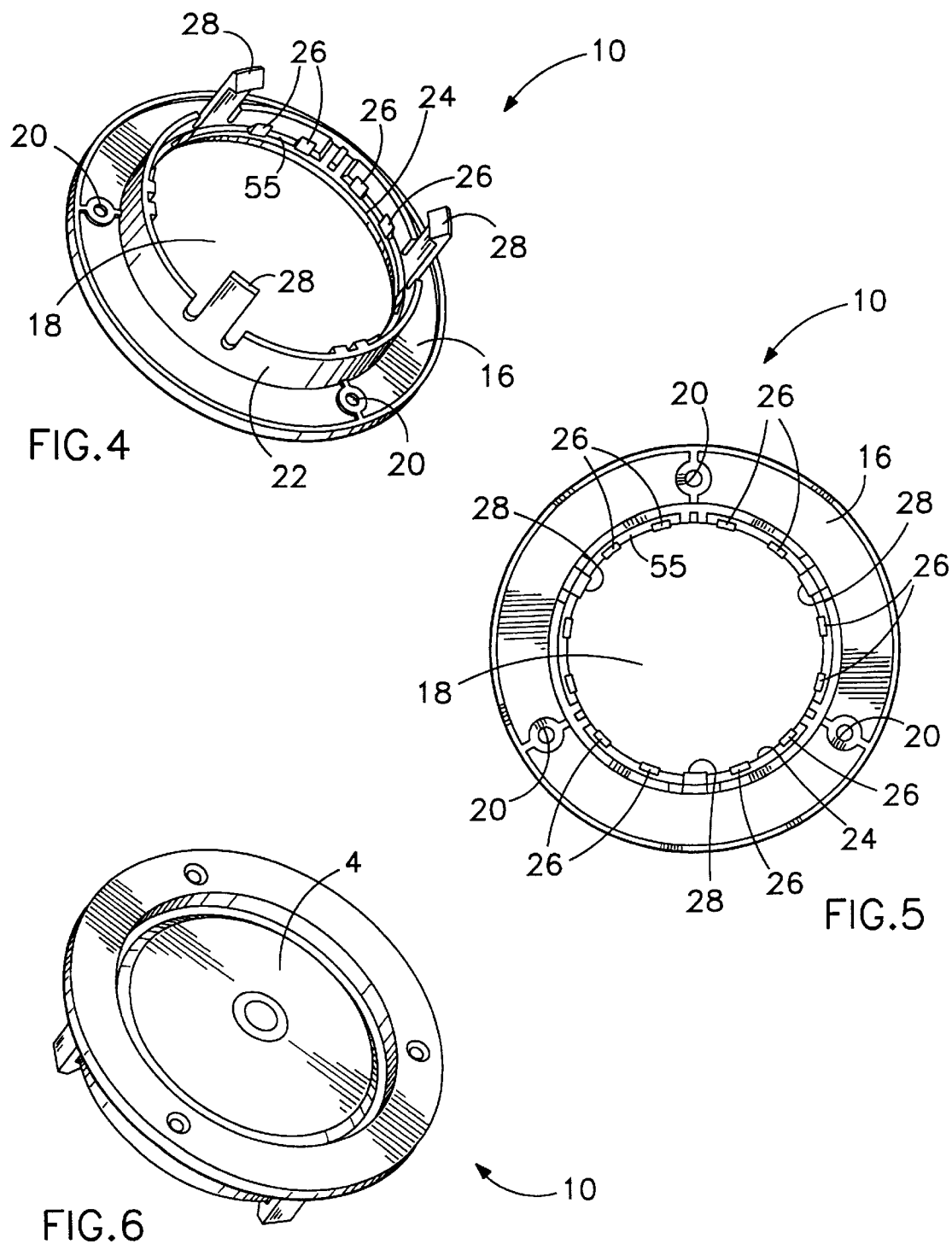

SPRING CLIP FOR A VEHICLE LIGHT HOLDER RING

BACKGROUND OF THE INVENTION

1. Field of the Invention

The present invention generally relates to the field of vehicle lighting. More particularly, the present invention relates to the field of mounting means for vehicle lighting.

2. Description of the Prior Art

Specifically, most prior art vehicle lighting assemblies are well known in the art. These prior art vehicle lighting assemblies include a light fixture and a mounting bracket which maybe planarly mounted to a body of the vehicle. One disadvantage with these mounting brackets is that they can only retain one specific diameter of the light fixture.

It is desirable to provide a detachable mounting means with the capability of holding a plurality of different diameters of light fixtures. It is also desirable to provide a detachable mounting means which is easy to install without modifying the body of the vehicle.

SUMMARY OF THE INVENTION

The present invention is a vehicle light holder ring for vehicle light fixtures and mounted within an aperture provided on a body of a vehicle.

The light holder ring has a central opening which extends therethrough and at least three mounting apertures which also extend therethrough and surround the central opening. A rim is formed with the light holder ring and surrounds the central opening. A flange is formed with the rim to form an interior diameter for retaining one diameter of the light fixture. A plurality of spring means are formed with a rear edge of the flange and extend inwardly in a radial direction to form a diameter which is slightly smaller than the diameter of the flange for tightly engaging a plurality of different diameters of the light fixture. The light holder ring further includes at least three retaining clips formed with a bottom edge of the rim for holding a bottom end of the light fixture to the light holder ring. The light fixture is inserted through the central opening on the light holder ring such that the plurality of spring means engage with the light fixture to create a tight fit thereto. The light fixture can also be engaged with the flange, depending on the diameter of a light fixture.

It is an object of the present invention to provide a vehicle light holder ring which can hold a plurality of light fixtures that have a plurality of different diameters.

It is an additional object of the present invention to provide a vehicle light holder ring in which the size is standard so that the mounting opening on the body of the vehicle does not have to be modified.

It is a further object of the present invention to provide a vehicle light holder ring which can be easily installed to the vehicle.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated:

FIG. 4 is a rear perspective view of the present invention vehicle light holder ring;

FIG. 5 is a rear plan view of the present invention vehicle light holder ring; and FIG. 6 is a perspective view of the present invention vehicle light holder ring with a flat vehicle light installed thereto.

DETAILED DESCRIPTION OF THE PREFERRED EMBODIMENTS

Although specific embodiments of the present invention will now be described with reference to the drawings, it should be understood that such embodiments are by way of example only and merely illustrative of but a small number of the many possible specific embodiment which can represent applications of the principles of the present invention. Various changes and modifications obvious to one skilled in the art to which the present invention pertains are deemed to be within the spirit, scope and contemplation of the present invention as further defined in the appended claims.

Figure 1:
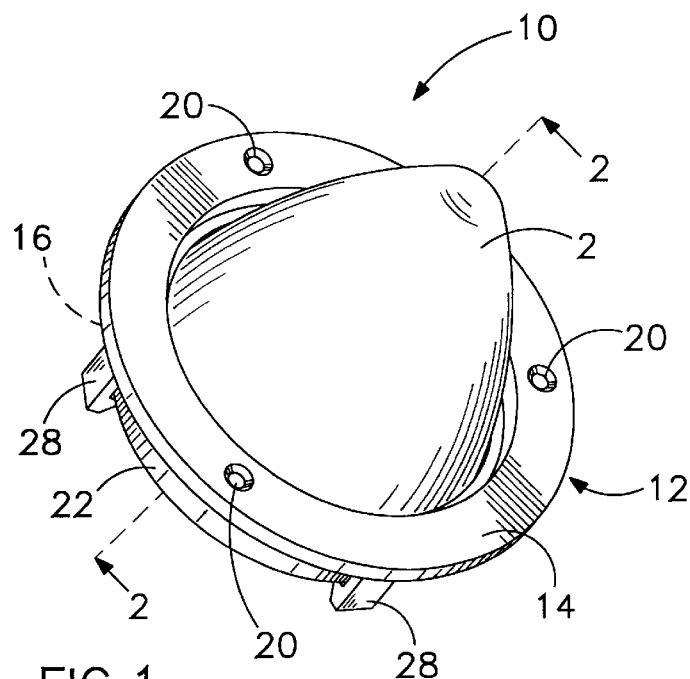
FIG. 1 is a perspective view of the present invention vehicle light holder ring with a dome vehicle light installed thereto.
Figure 2:
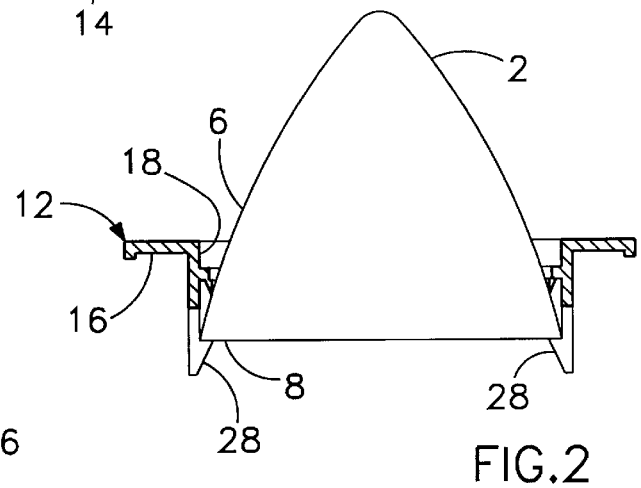
FIG. 2 is a cross-sectional view taken along line 2—2 of FIG. 1.

FIG. 1 shows the present invention detachable vehicle light holder 10 for holding a first type of light fixture 2 thereto. FIG. 6 shows the present invention detachable vehicle light holder 10 for holding a second type of light fixture 4. Referring to FIGS. 1 and 6, there is shown at 10 the present invention detachable vehicle light holder ring or mounting bracket used on a vehicle (not shown) and mounted within an aperture provided on a body of the vehicle for holding the light fixtures 2 and 4 against the body of the vehicle.

Referring to FIGS. 1 through 5, the present invention detachable vehicle light holder ring 10 has a generally circular shaped body 12 which includes a front side 14, a rear side 16, a central opening 18 extends from the front side 14 to the rear side 16 and at least three spaced apart mounting apertures 20 extend from the front side 14 to the rear side 16 and surround the central opening 18.

Figure 3:
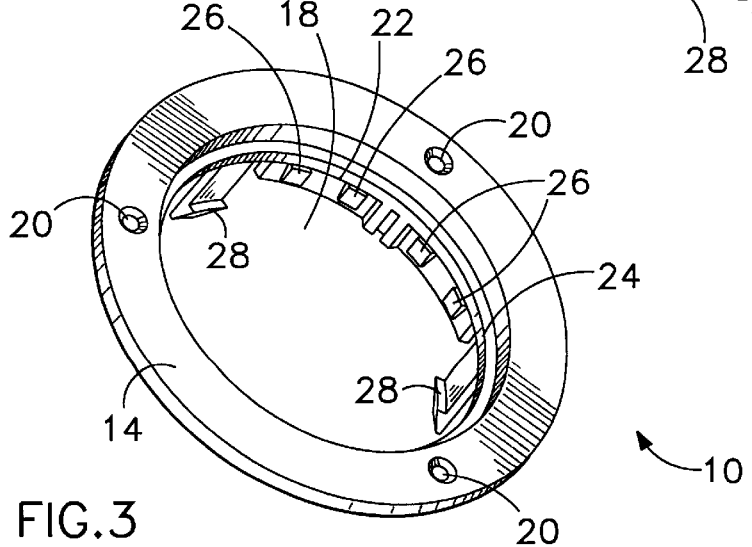
FIG. 3 is a front perspective view of the present invention vehicle light holder ring.

Referring to FIGS. 3 and 4, there is provided a periphery rim 22 which is integrally formed with the rear side 16 of the body 12 of the vehicle light holder ring 10 and surrounds the central opening 18. There is also provided an annular flange 24 which is integrally formed with the interior surface of the periphery rim 22 to form an interior diameter for retaining one diameter of the light fixture.

Referring to FIGS. 4 and 5, there is provided with a plurality of spaced apart spring means 26 which may be flexible leaf springs or other suitable spring means and are integrally formed with a rear edge 55 of the annular flange 24 and extend or tilt inwardly in a radial direction to form a diameter which is slightly smaller than the diameter of the annular flange 2 for tightly engaging with a plurality of different diameters of the light fixture 2.

Referring to FIGS. 1 through 5, there is further provided with three spaced apart retaining clips 28 which are integrally formed with a bottom edge of the periphery rim 22 for holding a bottom edge 8 of the light fixture 2 to the body 12 of the vehicle light holder ring 10.

The light fixture 2 is inserted through the central opening 18 of the body 12 of the vehicle light holder ring 10 from the rear side 16 such that the plurality of spring means 26 engage with an exterior surface 6 of the light fixture 2 to create a tight fit thereto. If the diameter of the light fixture 2 has a diameter which is larger than the diameter formed by the plurality of spring means 26, then the flange 24 would engage with the exterior surface 6 of the light fixture 2, and thereby provides a second engagement for the vehicle light holder ring 10.

It will be appreciated that the light fixtures shown in FIGS. 1 and 6 are merely two illustrative arrangements which can be used with the present invention vehicle light holder ring 10. It is within the spirit and scope of the present invention to have a plurality of different shaped light fixtures which can be used with the present invention vehicle light holder ring 10.

The present invention conforms to conventional forms of manufacture or any other conventional way known to one skilled in the art, and is of simple construction and is easy to use. The detachable holder ring can be made from several materials. By way of example, the detachable holder ring can be made of plastic material or any other suitable material. The manufacturing process which could accommodate the construction of the detachable holder ring may be injection, thermoform, etc. or other molding process.

Defined in detail, the present invention is a mounting bracket used in conjunction with a vehicle and mounted within an aperture provided on a body of the vehicle for holding a light fixture against the body of the vehicle, the mounting bracket comprising: (a) a generally circular shaped body having a front side, a rear side, a central opening extending from the front side to the rear side and at least three spaced apart mounting apertures extending from the front side to the rear side and surrounding the central opening; (b) a periphery rim integrally formed with the rear side of the circular shaped body and surrounding the central opening of the circular shaped body; (c) a flange integrally formed with the interior surface of the periphery rim to form an interior diameter for retaining one diameter of the light fixture; (d) a plurality of spaced apart spring means integrally formed with a rear edge of the flange and extending inwardly in a radial direction to form a diameter which is slightly smaller than the diameter of the flange for tightly retaining a plurality of different diameters of the light fixture; and (e) at least three spaced apart retaining clips integrally formed with a bottom edge of the periphery rim for holding a bottom end of the light fixture to the circular shaped body of the mounting bracket; (f) whereby the light fixture is inserted through the circular shaped body of the mounting bracket from the rear side of the body such that the plurality of spring means or the flange engage with an exterior surface the light fixture to create a tight fit thereto.

Defined broadly, the present invention is a mounting bracket used in conjunction with a vehicle and mounted within an aperture provided on a body of the vehicle for holding a light fixture against the body of the vehicle, the mounting bracket comprising: (a) a body having a first side, a second side, a central opening extending from the first side to the second side and at least two mounting apertures extending from the first side to the second side; (b) a rim attached to the body and surrounding the central opening; (c) a flange attached to the interior surface of the rim to form a diameter for retaining one diameter of the light fixture; (d) at least two spring means attached an edge of the flange and extending inwardly in a radial direction to form a diameter which is slightly smaller than the diameter of the flange for tightly retaining a plurality of different diameters of the light fixture; and (e) means for holding a bottom end of the light fixture to the body of the mounting bracket; (f) whereby the light fixture is inserted through the body of the mounting bracket from the rear side of the body such that the at least two spring means or the flange engage with an exterior surface of the light fixture to create a tight fit thereto.

Defined more broadly, the present invention is a mounting bracket used in conjunction with a vehicle and mounted within an aperture provided on a body of the vehicle for holding a light fixture against the body of the vehicle, the mounting bracket comprising: (a) a body having an opening extending therethrough and at least two mounting apertures extending therethrough; (b) a rim attached to the body and surrounding the opening; (c) at least two spring means attached the rim and tilting inwardly in a radial direction to form a diameter which is slightly smaller than a diameter of the rim for tightly retaining light fixtures with different diameters; and (d) means for holding a bottom end of the light fixture to the body of the mounting bracket; (e) whereby the light fixture is inserted through the body of the mounting bracket such that the at least two spring means engage with an exterior surface of the light fixture to create a tight fit thereto.

Of course the present invention is not intended to be restricted to any particular form or arrangement, or any specific embodiment, or any specific use, disclosed herein, since the same may be modified in various particulars or relations without departing from the spirit or scope of the claimed invention hereinabove shown and described of which the apparatus or method shown is intended only for illustration and disclosure of an operative embodiment and not to show all of the various forms or modifications in which this invention might be embodied or operated.

The present invention has been described in considerable detail in order to comply with the patent laws by providing full public disclosure of at least one of its forms. However, such detailed description is not intended in any way to limit the broad features or principles of the present invention, or the scope of the patent to be granted. Therefore, the invention is to be limited only by the scope of the appended claims.

What is claimed is:

1. A mounting bracket used in conjunction with a vehicle and mounted within an aperture provided on a body of the vehicle for holding a light fixture against the body of the vehicle, the mounting bracket comprising:
   a. a generally circular shaped body having a front side, a rear side, a central opening extending from the front side to the rear side and at least three spaced apart mounting apertures extending from the front side to the rear side and surrounding the central opening;
   b. a periphery rim integrally formed with said rear side of said circular shaped body and surrounding said central opening of said circular shaped body;
   c. a flange integrally formed with the interior surface of said periphery rim to form an interior diameter for retaining one diameter of said light fixture;
   d. a plurality of spaced apart spring means integrally formed with a rear edge of said flange and extending inwardly in a radial direction to form a diameter which is, slightly smaller than said diameter of said flange for tightly retaining a plurality of different diameters of said light fixture; and
   e. at least three spaced apart retaining clips integrally formed with a bottom edge of said periphery rim for holding a bottom end of said light fixture to said circular shaped body of said mounting bracket;
   f. whereby said light fixture is inserted through said circular shaped body of said mounting bracket from said rear side of said body such that said plurality of spring means or said flange engage with an exterior surface of said light fixture to create a tight fit thereto.

2. A mounting bracket used in conjunction with a vehicle and mounted within an aperture provided on a body of the vehicle for holding a light fixture against the body of the vehicle, the mounting bracket comprising:

a. a body having a first side, a second side, a central opening extending from the first side to the second side and at least two mounting apertures extending from the first side to the second side;

b. a rim attached to said body and surrounding said central opening;

c. a flange attached to the interior surface of said rim to form a diameter for retaining one diameter of said light fixture;

d. at least two spring means attached an edge of said flange and extending inwardly in a radial direction to form a diameter which is slightly smaller than said diameter of said flange for tightly retaining a plurality of different diameters of said light fixture; and e. means for holding a bottom end of said light fixture to said body of said mounting bracket;

f. whereby said light fixture is inserted through said body of said mounting bracket from said rear side of said body such that said at least two spring means or said flange engage with an exterior surface of said light fixture to create a tight fit thereto.

3. The mounting bracket in accordance with claim 2, wherein said body is generally a circular shape.

4. The mounting bracket in accordance with claim 2, wherein said holding means includes at least three retaining clips formed with a bottom edge of said rim for holding a bottom end of said light fixture to said body of said mounting bracket.

5. A mounting bracket used in conjunction with a vehicle and mounted within an aperture provided on a body of the vehicle for holding a light fixture against the body of the vehicle, the mounting bracket comprising:

a. a body having an opening extending therethrough and at least two mounting apertures extending therethrough;

b. a rim attached to said body and surrounding said opening;

c. at least two spring means attached said rim and tilting inwardly in a radial direction to form a diameter which is slightly smaller than a diameter of said rim for tightly retaining light fixtures with different diameters; and d. means for holding a bottom end of said light fixture to said body of said mounting bracket;

e. whereby said light fixture is inserted through said body of said mounting bracket such that said at least two spring means engage with an exterior surface of said light fixture to create a tight fit thereto.

6. The mounting bracket in accordance with claim 5, further comprising a flange attached to an interior surface of said rim.

7. The mounting bracket in accordance with claim 5, wherein said body is generally a circular shape.

8. The mounting bracket in accordance with claim 5, wherein said holding means includes at least three retaining clips formed with a bottom edge of said rim for holding a bottom end of said light fixture to said body of said mounting bracket.

* * * * *